(12) United States Patent
Zhao et al.

(10) Patent No.: US 12,449,037 B2
(45) Date of Patent: Oct. 21, 2025

(54) DUAL SEALING RING CONNECTORS (71) Applicant: AIGI Environmental Inc., Jiangsu (CN)

(72) Inventors: Jingwei Zhao, Jiangsu (CN); Jun Zhang, Jiangsu (CN)

(73) Assignee: AIGI Environmental, Jiangsu (CN)

( * ) Notice: Subject to any disclaimer, the term of this patent is extended or adjusted under 35 U.S.C. 154(b) by 0 days.

(21) Appl. No.: 18/434,340

(22) Filed: Feb. 6, 2024

(65) Prior Publication Data

US 2025/0146576 A1    May 8, 2025

(51) Int. Cl.
*F16J 15/3272* (2016.01)
*F16J 15/3248* (2016.01)
*F16J 15/3268* (2016.01)
*F16J 15/3284* (2016.01)

(52) U.S. Cl.
CPC ....... *F16J 15/3272* (2013.01); *F16J 15/3248* (2013.01); *F16J 15/3268* (2013.01); *F16J 15/3284* (2013.01)

(58) Field of Classification Search
CPC .... F16J 15/322; F16J 15/3248; F16J 15/3252; F16J 15/3268; F16J 15/3272; F16J 15/3284
USPC .................. 277/547, 551, 572, 631
See application file for complete search history.

(56) References Cited

U.S. PATENT DOCUMENTS

| | | | | |
|---|---|---|---|---|
| 3,848,880 A | * | 11/1974 | Tanner | F16J 15/32 277/467 |
| 4,674,756 A | * | 6/1987 | Fallon | B67D 1/0829 277/606 |
| 5,113,991 A | * | 5/1992 | Kajitani | F16D 25/087 192/85.53 |
| 5,149,108 A | * | 9/1992 | Leiszter | F16J 15/067 403/364 |
| 5,149,109 A | * | 9/1992 | Jelinek | F16J 15/127 403/381 |
| 5,536,018 A | * | 7/1996 | Szott | F16J 15/104 277/650 |
| 5,906,377 A | * | 5/1999 | Salameh | F16B 3/00 277/632 |

(Continued)

FOREIGN PATENT DOCUMENTS

CN           103195776 A  *  7/2013  ........... F16J 15/3248

*Primary Examiner* — Nicholas L Foster
(74) *Attorney, Agent, or Firm* — Volpe Koenig (57) ABSTRACT

A dual sealing ring connector comprising: a first resilient sealing ring; a second resilient sealing ring partially embedded in the first resilient sealing ring; characterized in that the dual sealing ring connector comprises a holding portion and an inserting portion; the inserting portion is shaped to correspond to the holding portion and embedded into the holding portion; the inserting portion comprises a joint head, a joint rod, and locking tabs; the joint rod extends in a radial direction, an axial direction or a circumferential direction; the joint head is arranged at the end of the joint rod and is mirror image symmetrical with regard to its axis of symmetry; the locking tabs are arranged on both sides of the joint rod and are spaced apart from the joint rod by a distance; the locking tabs extend in the same direction as the extension direction of the joint rod, and its length in the extension direction is less than ⅔ of the sum of the lengths of the joint head and the joint rod in the extension direction of the joint rod.

10 Claims, 10 Drawing Sheets

(56) References Cited

U.S. PATENT DOCUMENTS

| | | | | |
|---|---|---|---|---|
| 6,076,645 | A | * | 6/2000 | Winkelmann ........ F16D 25/083 277/577 |
| 6,626,438 | B2 | * | 9/2003 | Walden .................. F15B 15/16 277/584 |
| 6,835,000 | B2 | * | 12/2004 | Hiramatsu ............ F16C 19/163 384/523 |
| 7,011,482 | B2 | * | 3/2006 | Underwood .......... F16B 43/006 411/539 |
| 7,604,243 | B2 | * | 10/2009 | Zitting ................. F16J 15/3236 277/584 |
| 2016/0153563 | A1 | * | 6/2016 | Bissoon ............... F16J 15/3204 29/428 |
| 2019/0170254 | A1 | * | 6/2019 | Taslakian ................ F16K 41/08 |
| 2022/0282792 | A1 | * | 9/2022 | Zhao ................... F16J 15/3252 |

* cited by examiner

DUAL SEALING RING CONNECTORS

RELATED APPLICATION DATA

The present application claims priority to Chinese Patent Application No. 202311472764.6, filed Nov. 7, 2023, the entirety of which is incorporated by reference as if fully set forth herein.

TECHNICAL FIELD

The present application relates to a connector, specifically to a connector for rotating or reciprocating parts in a mechanical device, which comprises a configuration of dual sealing rings.

BACKGROUND

In order to improve the sealing performance of hydro-pneumatic systems, extend equipment life and reduce energy consumption, seals are essential as key components of pneumatic systems. Conventional single-ring seals are difficult to meet the demands of complex working conditions, so integral seal ring combination seal designs are used, combining different materials and configurations to ensure the reliability of the system. However, the conventional combination seal designs have the problem of easy separation, especially under uneven pressure and severe extrusion, which may lead to seal failure. At the same time, although the overall performance of the rotary oil seal is better, it is more difficult to install and remove, which may damage other equipment components, thus affecting the efficiency and quality of equipment operation.

In order to solve these problems, anti-deformation hook embedded connection type hydro-pneumatic combination seal ring and split oil seal technology came into being. This technology consists of two sealing rings connected to each other by means of an insertion interface with a reverse force anti-deformation configuration. Split oil seals, on the other hand, utilize a design in which a notch exists somewhere in the ring configuration, allowing the seal to be easily mounted and removed without interfering with other components. However, the presence of the notch may reduce the sealing, operability, and reliability of the device.

The dual-ring notch bearing protector in the prior art uses an inserted joint to improve the structural integrity of the entire bearing protector and ensure its reliable operation. However, because the inner ring notch is flat and straight, coupled with the thermal expansion and contraction characteristics of the resilient material, a gap may appear at the inner ring notch, resulting in a decrease in sealing. In addition, the deformation-resistant hook-and-loop connection type combination seals for hydraulic cylinders and air cylinders have problems in their design in that the size of the plug joint is difficult to control and the resilient material is affected by heat.

In summary, the development of a hydro-pneumatic combination sealing technology with stability, ease of installation and removal, and a high degree of leak tightness remains a challenge that requires overcoming material properties and structural issues in the design to ensure reliable operation in a wide range of operating conditions.

SUMMARY OF THE INVENTION

It is an object of the present application to solve one or more of the above technical problems, whereby the present application provides a dual sealing ring connector which overcomes material properties and structural problems and ensures reliable operation under various operating conditions.

The present application proposes a dual sealing ring connector comprising: a first resilient sealing ring; a second resilient sealing ring partially embedded in the first resilient sealing ring; characterized in that the dual sealing ring connector comprises a holding portion and an inserting portion; the inserting portion is shaped to correspond to the holding portion and embedded into the holding portion; the inserting portion comprises a joint head, a joint rod, and locking tabs; the joint rod extends in a radial direction, an axial direction or a circumferential direction; the joint head is arranged at the end of the joint rod and has a shape that is mirror-image symmetrical along an axis of symmetry of the joint rod; the locking tabs are arranged on both sides of the joint rod and are spaced apart from the joint rod by a distance; the locking tabs extend in the same direction as the extension direction of the joint rod, and its length in the extension direction is less than $\frac{2}{3}$ of the sum of the lengths of the joint head and the joint rod in the extension direction of the joint rod.

According to an optional embodiment, the holding portion is arranged on one of the first resilient sealing ring or the second resilient sealing ring, and the inserting portion is arranged on the other of the first resilient sealing ring or the second resilient sealing ring; or the first resilient sealing ring comprises a first radial notch, the second resilient sealing ring comprises a second radial notch spaced in a circumferential direction by more than 5 degrees from the first radial notch, the holding portion and the inserting portion are arranged both on the first resilient sealing ring and are separated by the first radial notch, another holding portion and another inserting portion are arranged both on the second resilient sealing ring and are separated by the second radial notch.

According to an optional embodiment, in the case where the first resilient sealing ring and the second resilient sealing ring each comprise an inserting portion, the inserting portion arranged on the first resilient sealing ring has a different shape than another inserting portion arranged on the second resilient sealing ring, and the latter has a size of 35%-75% of the former.

According to an optional embodiment, the joint head comprises a flat section and inclined sections arranged on both sides of the flat section; the outer edge of the flat section is in a straight or curved line with a length less than the length of the base of the joint rod in the direction perpendicular to the extension direction of the joint rod; the length of the inclined sections is 30%-80% of the sum of the lengths of the joint head and the joint rod in the extension direction of the joint rod; an angle between the inclined sections and the joint rod is acute; and in the direction perpendicular to the extension direction of the joint rod, the maximum length of the joint head is 130%-200% of the length of the base of the joint rod.

According to an optional embodiment, the cross-sectional shape of the joint head comprises a semicircular, oval, trapezoidal, anchor, or crescent shape.

According to an optional embodiment, the locking tabs comprise a raised portion extending toward the joint rod; and an angle between the extension direction of the locking tabs and the extension direction of the joint rod is 5-35 degrees, such that a spacer sleeve configuration is formed between a portion of the holding portion corresponding to the joint rod and a portion of the holding portion corresponding to the locking tabs.

According to an optional embodiment, the joint rod has a shape that tapers with extension; and the sides of the joint rod are curved.

According to an optional embodiment, the spacer sleeve configuration has at least one resiliently bending and deforming portion with a radius of curvature of 1-4 mm such that, in the event that the inserting portion is inserted into the holding portion, the protruding portion squeezes the spacer sleeve configuration in order to resiliently deform the spacer sleeve configuration against the joint rod and the joint head.

According to an optional embodiment, the spacing distance between the joint head and the locking tabs is 1-3 times the difference between the maximum length of the joint head in the direction perpendicular to the extension direction of the joint rod and the minimum length of the joint rod in the direction perpendicular to the extension direction of the joint rod.

According to an optional embodiment, the first resilient sealing ring and the second resilient sealing ring are made of rubber-plastic materials with the same or different hardness.

The dual sealing ring connector according to the present application has the following advantages:

The spacer sleeve configuration formed between a portion of the holding portion corresponding to the joint rod and a portion of the holding portion corresponding to the locking tabs improves the resilient expansion property of the joint socket of the holding portion, making the joint head easy to pass through.

The locking cam can play a role in restoring and enhancing the resilience of the spacer sleeve configuration, so that the spacer sleeve configuration can maintain good resilience for a long time.

The protruding portion of the locking cam extrudes the spacer sleeve configuration to produce a resilient deformation thereof to compensate for the interference press fit formed by the fit gap between the spacer sleeve configuration and the joint rod. In this way, the clamping effect of the holding portion on the joint and the joint rod is improved, which in turn can effectively enhance the connection strength of the dual sealing ring connector.

The raised portion of the locking tabs provides a secondary locking of the joint head. In this way, loosening at the interface of the holding portion is avoided.

Due to the above advantages, the dual sealing ring connectors according to the present application can effectively avoid serious misalignment and dislocation between the seals due to extrusion during the working process, improve the sealing capacity and ensure the reliability of the operation of the equipment.

BRIEF DESCRIPTION OF DRAWINGS

The foregoing and other aspects of the present application will be more fully understood from the foregoing detailed description and in conjunction with the following drawings. It should be noted that the proportions of the accompanying drawings may differ for purposes of clarity, but this will not affect the understanding of the present application.

DETAILED DESCRIPTION OF EMBODIMENTS

Exemplary embodiments of the present application will be described in greater detail below with reference to the accompanying drawings. Although exemplary embodiments of the present application are shown in the accompanying drawings, it should be understood, however, that the present application may be realized in various forms and should not be limited by the embodiments set forth herein. Rather, these embodiments are arranged to enable a more thorough understanding of the present application and to convey the full scope of the present application to those skilled in the art.

It should be noted that when an element is said to be "fixed to" or "arranged on" another element, it may be directly on the other element or indirectly on the other element. When an element is said to be "connected" to another element, it may be connected directly to the other element or indirectly to the other element.

It is important to understand that the terms "length", "width", "upper", "lower", "front", "rear", "left", "right", "vertical", "horizontal", "top", "bottom", "inside", "outside" and the like indicate orientations or positional relationships based on those shown in the accompanying drawings, and are intended only to facilitate the description of the present application and to simplify the description, and are not intended to indicate or imply that the device or element referred to must have a particular orientation, be constructed and operated in a particular orientation, and therefore are not to be construed as a limitation of the present application.

It is to be understood that the terms "first" and "second" are used for descriptive purposes only and should not be read as indicating or implying relative importance or implicitly specifying the number of technical features indicated. Thus, a feature defined with the terms "first", "second" may expressly or implicitly include one or more such features. In the description of the present application, "more", "several" means two or more, unless otherwise expressly and specifically limited.

It should be noted that the terms "mounted", "coupled", "connected" are to be understood in a broad sense, e.g. as a fixed connection, as a detachable connection, or as a connection in one piece; a mechanical or electrical connection; a direct connection or an indirect connection through an intermediate medium, or a connection within two elements.

Figure 1:
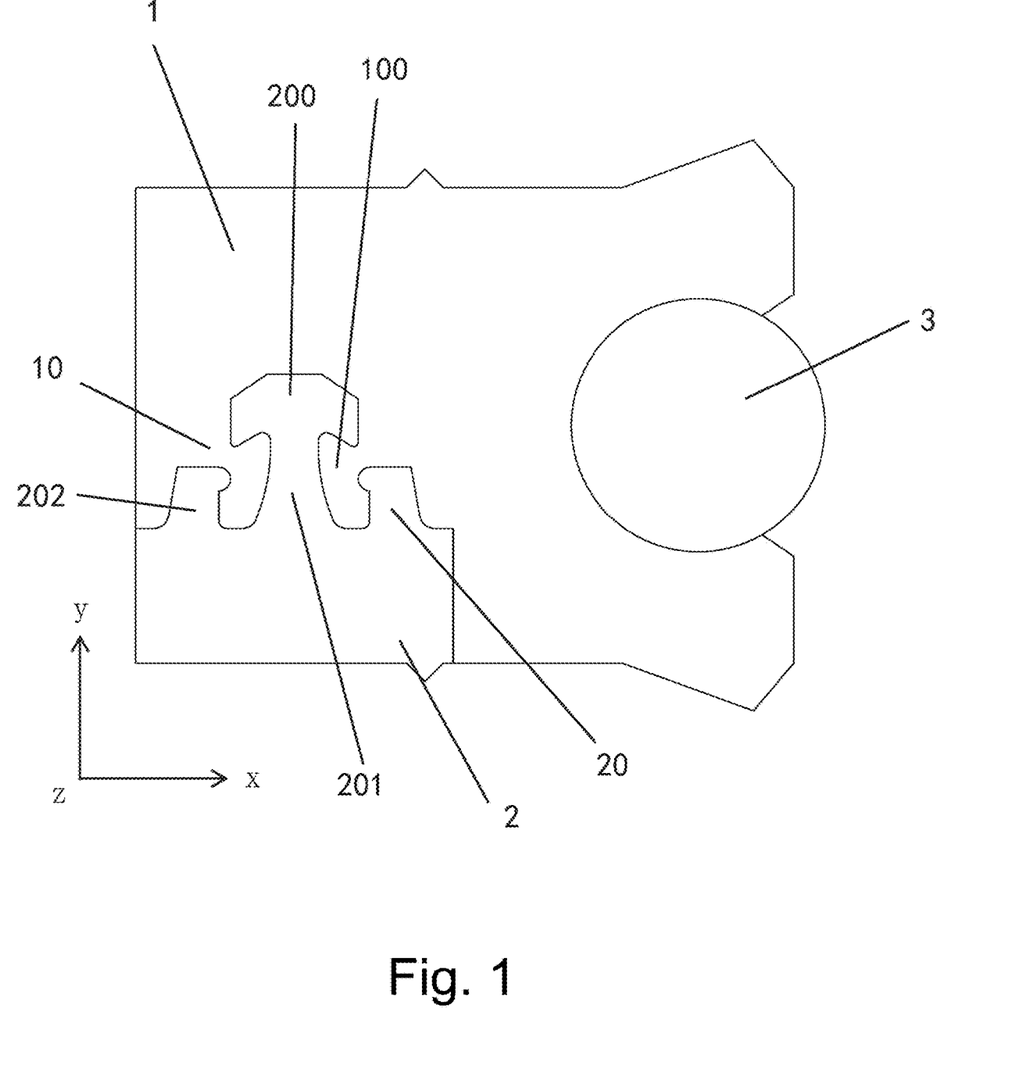
FIG. 1 is a cross-sectional view of a dual sealing ring connector according to a first embodiment of the present application.

FIG. 1 is a cross-sectional view of a dual sealing ring connector according to a first embodiment of the present application. In FIGS. 1-FIG. 9, the axial direction is denoted by x, the radial direction is denoted by y, and the circumferential direction is denoted by z. As shown in FIG. 1, the dual sealing ring connector comprises a first resilient sealing ring 1 and a second resilient sealing ring 2. The first resilient sealing ring 1 and the second resilient sealing ring 2 may be made of a rubber-plastic material with the same or different hardness. A rubber-plastic material is a synthetic material that has the properties of rubber and plastic and is commonly used in a variety of applications. Characteristics of such materials include good resilience, abrasion resistance, chemical resistance, and dimensional stability.

The first resilient sealing ring 1 comprises a recess for holding the O-ring 3. The second resilient sealing ring 2 is arranged on the inside of the first resilient sealing ring 1 in the radial direction y and is partially embedded in the first resilient sealing ring 1 in the radial direction y. In addition, the first resilient sealing ring 1 also abuts the second resilient sealing ring 2 in the axial direction x. The first resilient sealing ring 1 and the second resilient sealing ring 2 are usually subjected to forces in opposite directions in the radial direction y, which makes it necessary for the first resilient sealing ring 1 and the second resilient sealing ring 2 to counteract such forces in order not to disengage from each other along the radial direction y. In order to realize a strong bond in the radial direction y, the dual sealing ring connector according to the first embodiment of the present application is provided with an interlocking embedding configuration.

Referring further to FIG. 1, the first resilient sealing ring 1 comprises a holding portion 10 arranged on an inner peripheral surface of the first resilient sealing ring 1. The second resilient sealing ring 2 comprises an inserting portion 20 arranged on an outer peripheral surface of the second resilient sealing ring 2. The shape of the holding portion 10 corresponds to the shape of the inserting portion 20. In other words, in the case where the inserting portion 20 is inserted into the holding portion 10, there is no gap between the holding portion 10 and the inserting portion 20. This enables a seal to be realized and prevents the passage of liquids or gases.

Referring further to FIG. 1, the inserting portion 20 comprises a joint head 200, a joint rod 201 and locking tabs 202. The joint rod 201 extends outwardly from the outer peripheral surface of the second resilient sealing ring 2 along the radial direction y. The length of the joint rod 201 along the axial direction y becomes progressively smaller as the joint rod 201 extends outwardly along the radial direction y. The side of the joint rod 201 is curved. The joint head 200 is arranged at an end of the joint rod 201 and has a shape that is mirror-image symmetrical along an axis of symmetry of the joint rod 201. Locking tabs 202 are arranged on both sides of the joint rod 201 along the axial direction x and are spaced apart from the joint rod 201 by a distance on each side. The locking tabs 202 extend outwardly from the peripheral surface of the second resilient sealing ring 2 along the radial direction y, and their length along the radial direction y is less than ⅔ of the sum of the length of the joint head 200 along the radial direction and the length of the joint rod 201 along the radial direction.

Referring further to FIG. 1, the joint head 200 comprises a flat section and inclined sections arranged on both sides of the flat section on a side of the joint that is located away from the joint rod 201 along the radial direction. The length of the flat section along the axial direction x is less than the length of a base of the joint rod 201 along the axial direction x. The length of the inclined sections along the axial direction x is 30%-80% of the sum of the length of the joint head 200 along the radial direction y and the length of the joint rod 201 along the radial direction y. An angle between the inclined sections and the joint rod 201 is acute. The maximum length of the joint head 200 in the axial direction x is 130%-200% of the length of the base of the joint rod 201.

Referring further to FIG. 1, the locking cam 202 comprises a raised portion extending towards the joint rod 201. An angle between the raised portion and the axial direction x is 5-35 degrees, such that a spacer sleeve configuration 100 is formed between a portion of the holding portion 10 corresponding to the joint rod 201 and a portion of the holding portion 10 corresponding to the locking compression tab 202. The spacer sleeve configuration 100 has at least one resiliently bending and deforming portion with a radius of curvature of 1-4 mm. The spacing distance between the joint head 200 and the locking tabs 202 is 1-3 times the difference between the maximum length and the minimum length of the joint head 200 in the radial direction y. The spacer sleeve configuration formed between a portion of the holding portion 10 corresponding to the joint rod and a portion of the holding portion 10 corresponding to the locking tabs improves the resilient expansion property of the joint socket of the holding portion, making the joint head easy to pass through.

In the case where the inserting portion 20 is not inserted into the holding portion 10, the side of the portion of the holding portion 10 corresponding to the joint rod 201 is planar, so that in the case where the inserting portion 20 is inserted into the holding portion 10, the protruding portion squeezes the spacer sleeve configuration 100, so as to make the spacer sleeve configuration 100 resiliently deform to abut the joint rod 201 and the connector 200. The locking cam 202 may play a role in restoring and enhancing the resilience of the spacer sleeve configuration 100, so that the spacer sleeve configuration 100 may maintain good resilience for a long time. The protruding portion of the locking cam 202 squeezes the spacer sleeve configuration 100 to produce resilient deformation thereof to compensate for the interference fit formed by the fit gap between the spacer sleeve configuration 100 and the joint rod 201. In this way, the clamping effect of the holding portion 10 on the joint head 200 and the joint rod 201 is improved, which in turn can effectively enhance the connection strength of the dual sealing ring connector. The protruding portion of the locking tabs 202 may provide a secondary locking of the joint head 200. In this way, loosening at the interface of the holding portion 10 is avoided.

Figure 2:
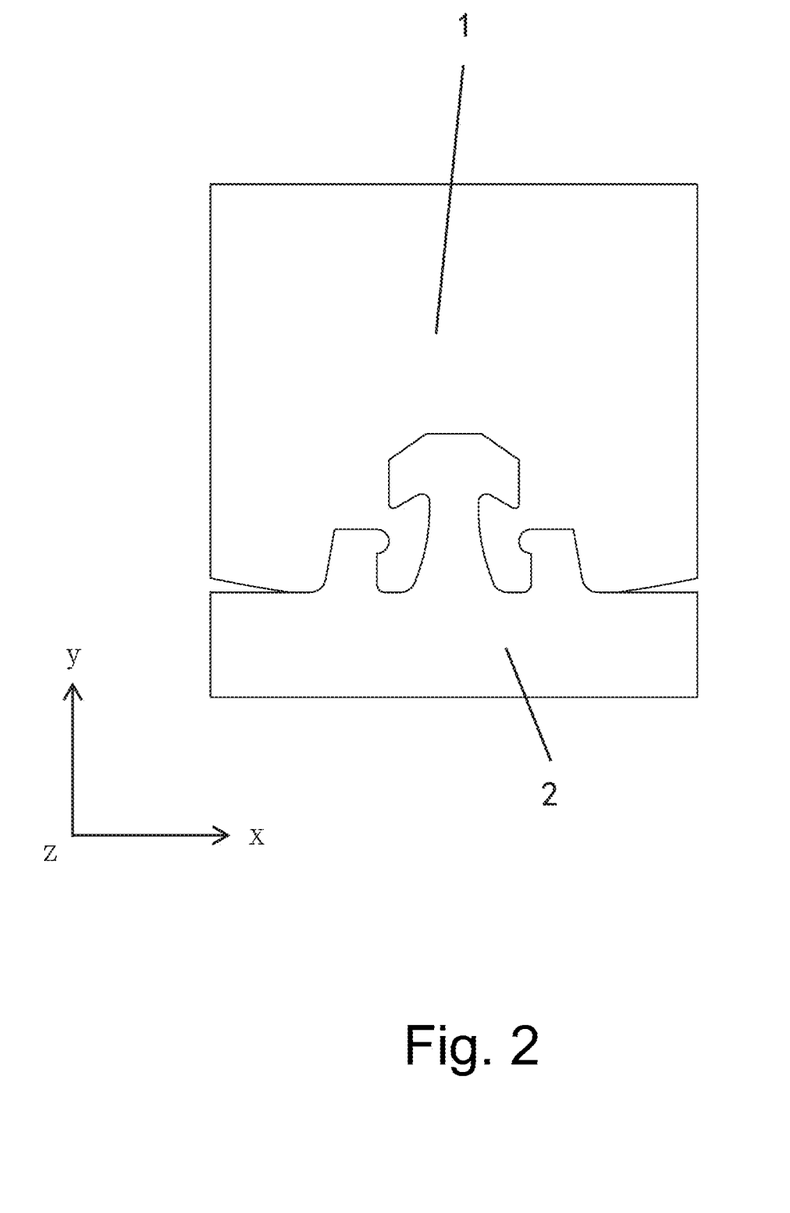
FIG. 2 is a cross-sectional view of a dual sealing ring connector according to a second embodiment of the present application.

FIG. 2 is a cross-sectional view of a dual sealing ring connector according to a second embodiment of the present application. Compared to the first embodiment, the first resilient sealing ring 1 of the dual sealing ring connector according to the second embodiment of the present application does not press against the second resilient sealing ring 2 along the axial direction x, but only along the radial direction y.

Figure 3:
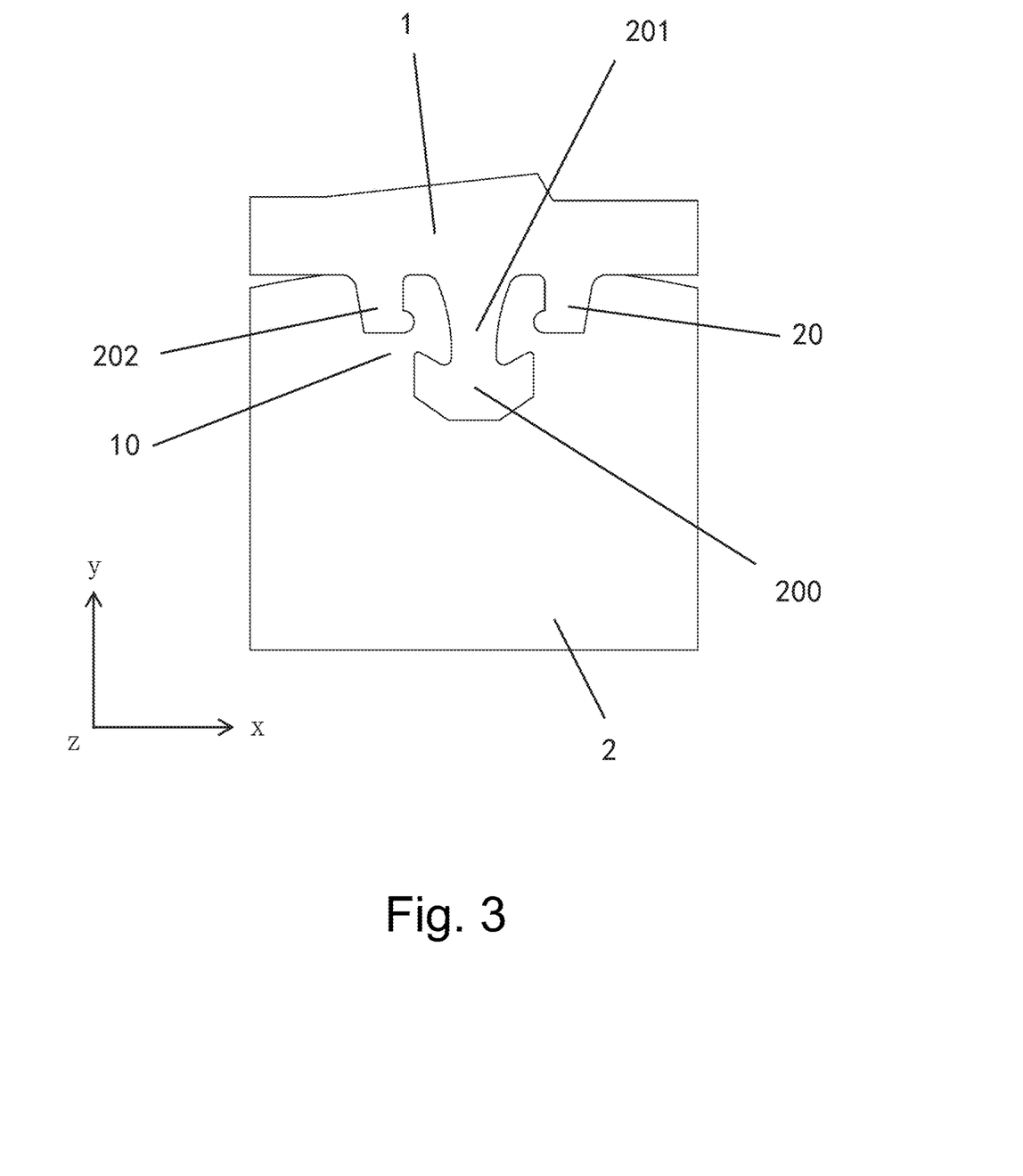
FIG. 3 is a cross-sectional view of a dual sealing ring connector according to a third embodiment of the present application.

FIG. 3 is a cross-sectional view of a dual sealing ring connector according to a third embodiment of the present application. Compared to the second embodiment, in the dual sealing ring connector according to the third embodiment of the present application, the first resilient sealing ring 1 comprises an inserting portion 20 arranged on an inner peripheral surface of the first resilient sealing ring 1. The second resilient sealing ring 2 comprises a holding portion 10 arranged on an outer peripheral surface of the second resilient sealing ring 2. In other words, the joint rod 201 extends inwardly from the inner peripheral surface of the first resilient sealing ring 1 in a radial direction y. The joint head 200 is arranged at an end portion of the joint rod 201 and has a shape that is mirror-image symmetrical along an axis of symmetry of the joint rod 201. The length of the joint rod 201 along the axial direction y becomes progressively smaller as the joint rod 201 extends inwardly along the radial direction y. The locking tabs 202 extend inwardly from the inner periphery of the first resilient sealing ring 1 along the radial direction y.

Figure 4:
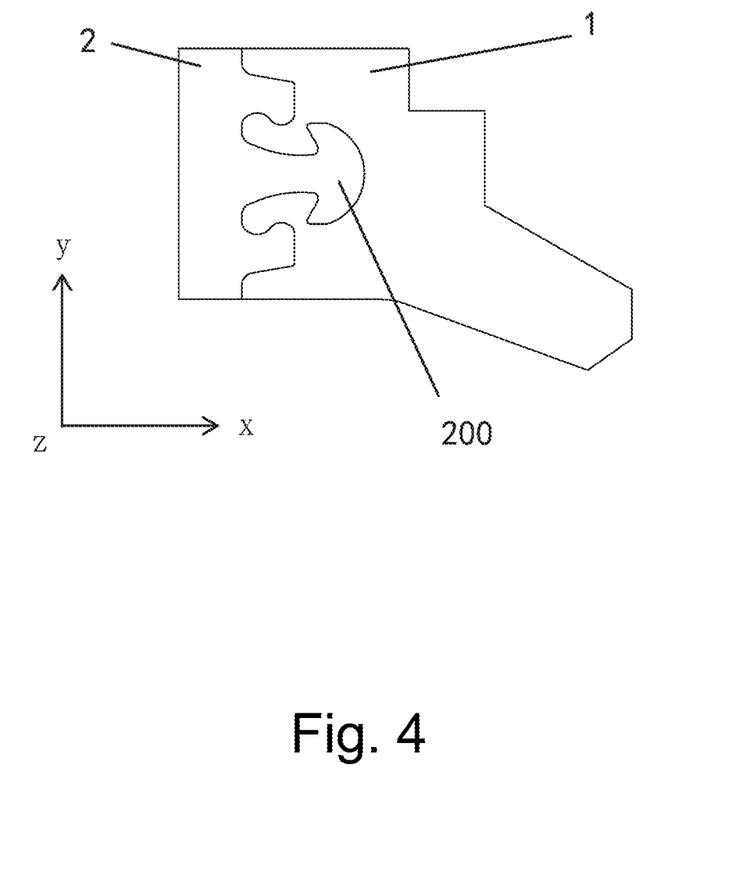
FIG. 4 is a cross-sectional view of a dual sealing ring connector according to a fourth embodiment of the present application.

FIG. 4 is a cross-sectional view of a dual sealing ring connector according to a fourth embodiment of the present application. Compared to the third embodiment, in the dual sealing ring coupling according to the fourth embodiment of the present application, the second resilient sealing ring 2 is arranged on the inside of the first resilient sealing ring 1 in the axial direction x and is partially embedded in the first resilient sealing ring 1 in the axial direction x. The first resilient sealing ring 1 and the second resilient sealing ring 2 are usually subjected to forces in opposite directions along the axial direction x, which makes it necessary for the first resilient sealing ring 1 and the second resilient sealing ring 2 to counteract such forces in order not to disengage from each other along the axial direction x. In order to realize a strong bond along the axial direction x, the dual sealing ring connector according to the fourth embodiment of the present application is arranged with an interlocking embedding configuration. In addition, the first resilient sealing ring 1 is arranged with a step portion on the side along the axial direction x away from the second resilient sealing ring 2, and a convex rib is arranged on the step portion. As shown in FIG. 4, the cross-sectional shape of the joint head 200 is crescent-shaped. It will be appreciated that the cross-sectional shape of the joint head 200 may also include a semicircle, an oval, a trapezoid, and an anchor shape.

Figure 5:
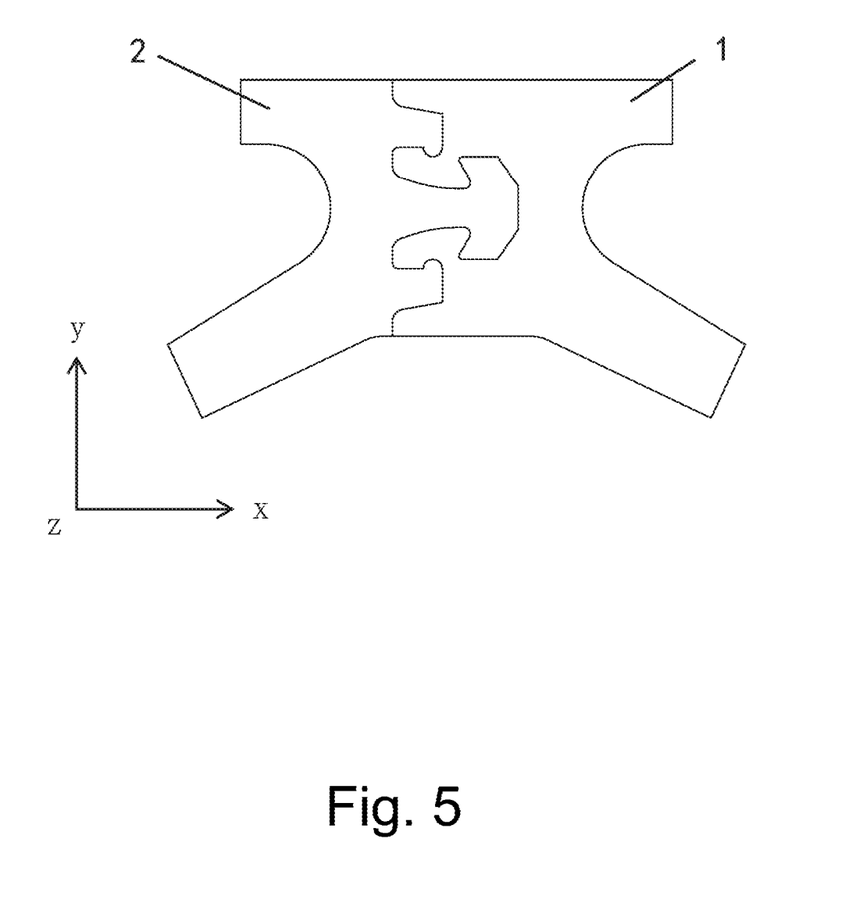
FIG. 5 is a cross-sectional view of a dual sealing ring connector according to a fifth embodiment of the present application.

FIG. 5 is a sectional view of a dual sealing ring connector according to a fifth embodiment of the present application. Compared to the fourth embodiment, in the fifth embodiment according to the present application, the first resilient sealing ring 1 is arranged with a plurality of convex ribs on a side along the axial direction x away from the second resilient sealing ring 2. The second resilient sealing ring 2 is also arranged with a plurality of convex ribs on the side along the axial direction x away from the first resilient sealing ring 1.

Figure 6:
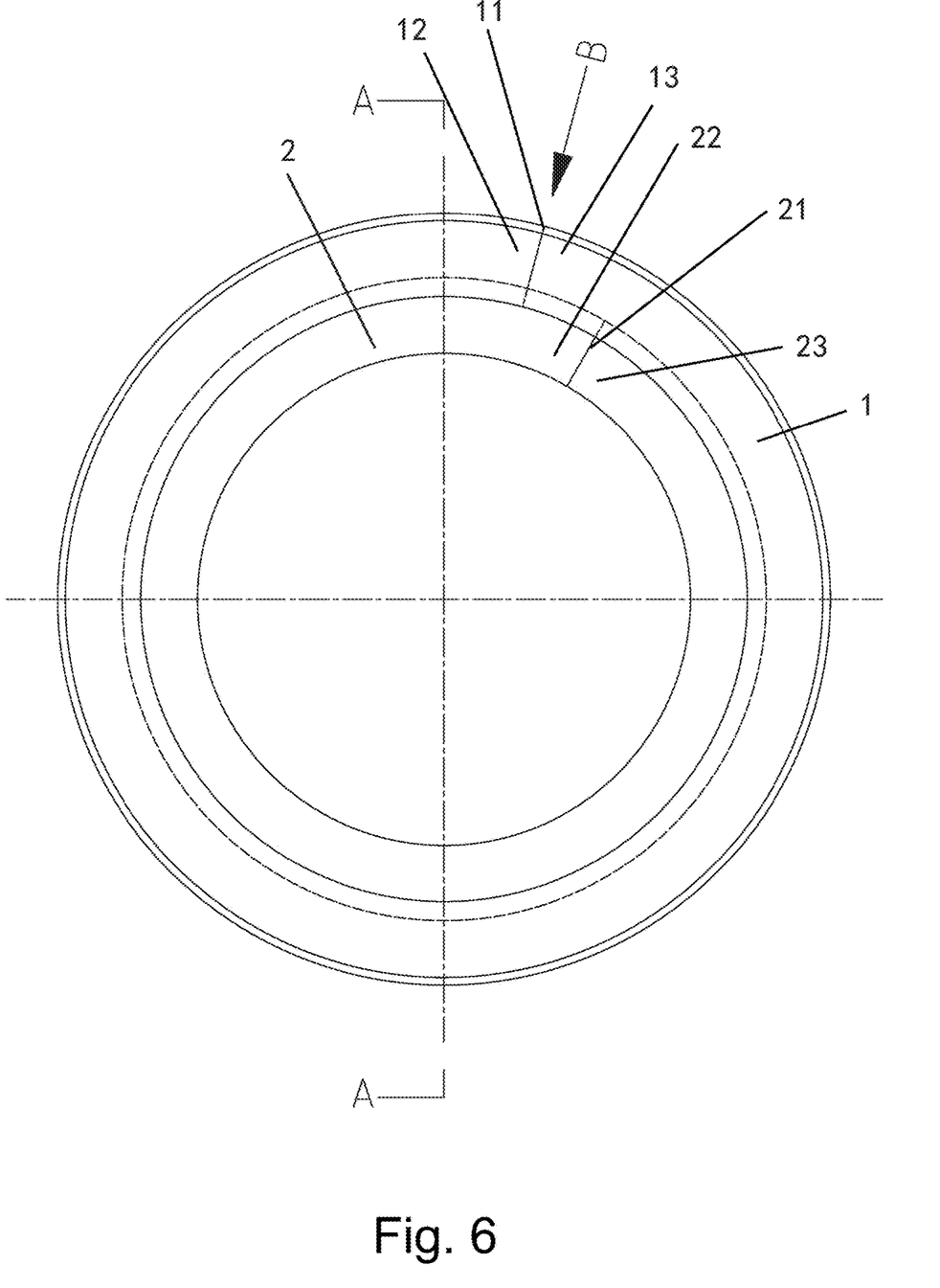
FIG. 6 is a schematic diagram of a dual sealing ring connector according to a sixth embodiment of the present application.

FIG. 6 is a schematic diagram of a dual sealing ring connector according to a sixth embodiment of the present application. As shown in FIG. 6, the dual sealing ring connector comprises a first resilient sealing ring 1 and a second resilient sealing ring 2. The first resilient sealing ring 1 and the second resilient sealing ring 2 are made of rubber-plastic materials with the same or different hardness. The second resilient sealing ring 2 is arranged in a radial direction y inside the first resilient sealing ring 1.

Figure 7:
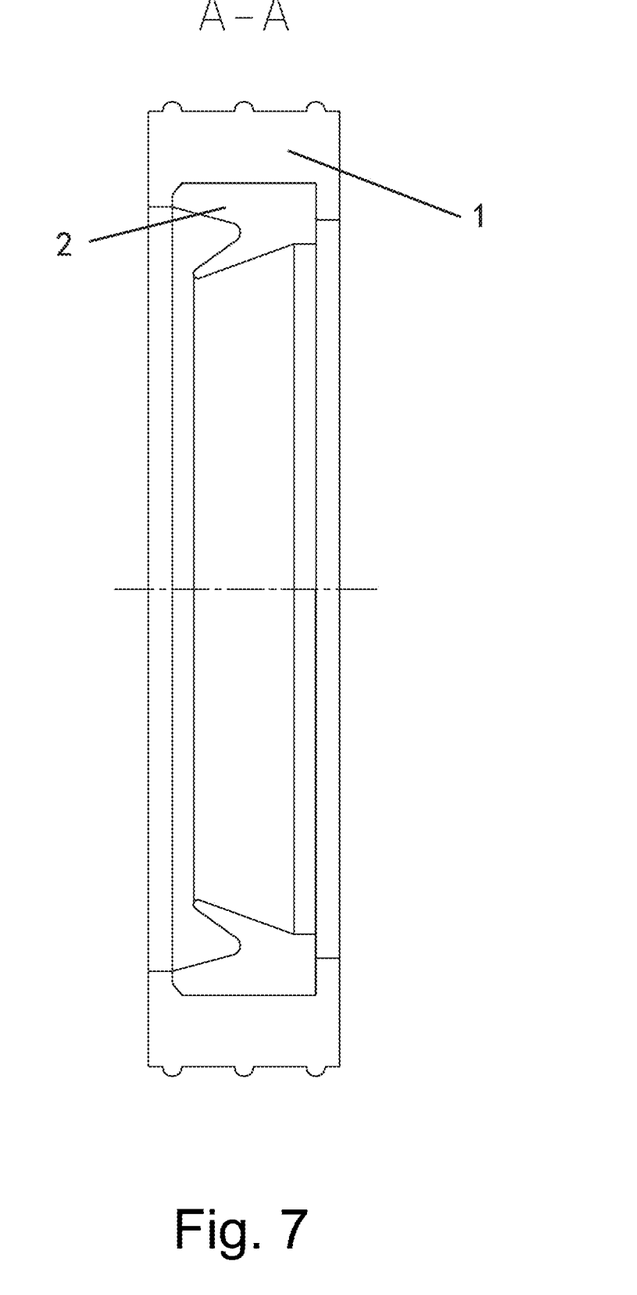
FIG. 7 is a cross-sectional view along line A-A of the dual sealing ring connector of FIG. 6.

FIG. 7 is a cross-sectional view along line A-A of the dual sealing ring connector of FIG. 6. As shown in FIG. 7, the second resilient sealing ring 2 is partially embedded in the first resilient sealing ring 1.

Figure 8:
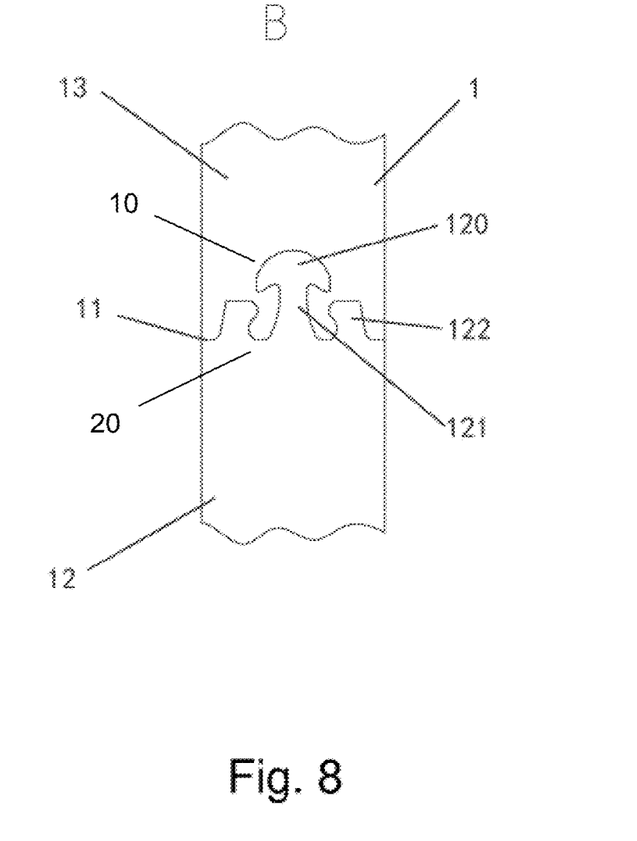
FIG. 8 is a side view along the B direction of the dual sealing ring connector of FIG. 6, illustrating a first resilient sealing ring.

FIG. 8 is a side view along the B direction of the dual sealing ring connector of FIG. 6. As shown in FIG. 8, the first resilient sealing ring 1 comprises a first radial notch 11 along the radial direction y and a first circumferential sealing portion 12 and a second circumferential sealing portion 13 arranged on both sides of the first radial notch 11 along the circumferential direction z. The shapes of the first circumferential sealing portion 12 and the second circumferential sealing portion 13 are complementary to and embedded in each other.

Returning to FIG. 6, similar to the first resilient sealing ring 1, the second resilient sealing ring 2 comprises a second radial notch 21 in a radial direction y and a third circumferential sealing portion 22 and a fourth circumferential sealing portion 23 arranged on both sides of the second radial notch 21 in a circumferential direction z. The shapes of the third circumferential sealing portion 22 and the fourth circumferential sealing portion 23 are complementary to each other and embedded in each other.

Referring further to FIG. 8, the first circumferential sealing portion 12 comprises a first circumferential joint head 120, a first circumferential joint rod 121, and first circumferential locking tabs 122. The first circumferential joint rod 121 extends from the first circumferential sealing portion 12 toward the second circumferential sealing portion 13 in the circumferential direction z. The first circumferential joint head 120 is arranged at an end portion of the first circumferential joint rod 121 and has a shape that is mirror-image symmetrical along an axis of symmetry of the first circumferential joint rod 121. The first circumferential locking tabs 122 are arranged on both sides of the first circumferential joint rod 121 in the axial direction x and are spaced apart from the first circumferential joint rod 121 by a distance on each side. The first circumferential locking tabs 122 extend in the circumferential direction z from the first circumferential sealing portion 12 toward the second circumferential sealing portion 13, and its length along the circumferential direction z is less than ⅔ of the sum of the lengths of the first circumferential joint head 120 and the first circumferential joint rod 121 along the circumferential direction z.

Figure 9:
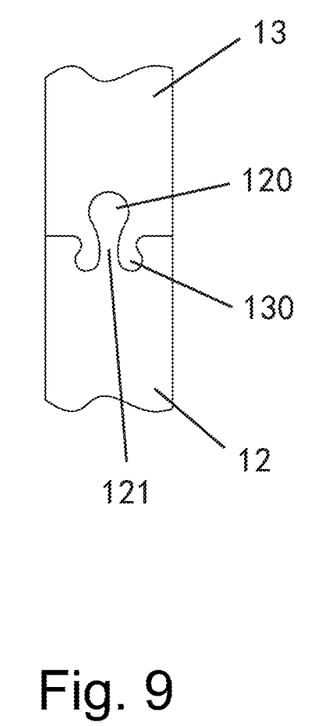
FIG. 9 is a side view of a dual sealing ring connector according to a seventh embodiment of the present application.
Figure 10:
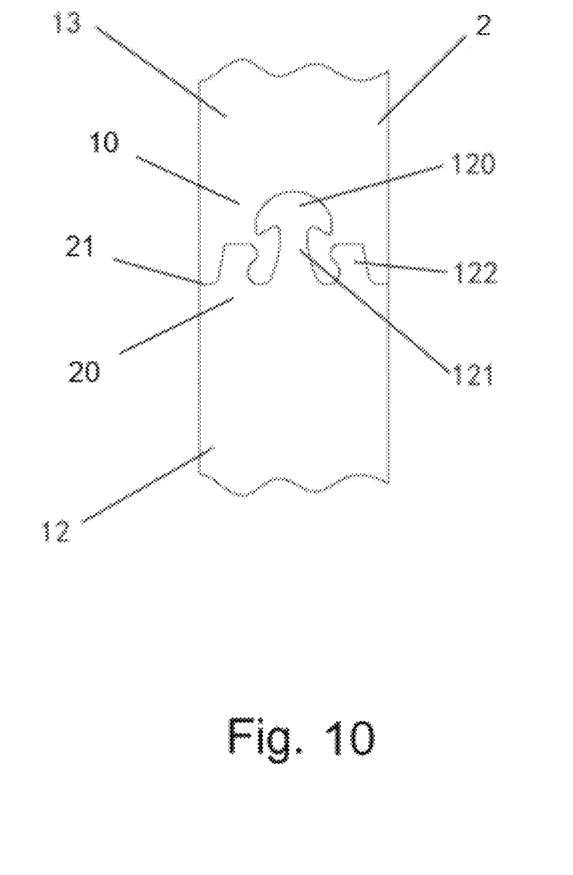
FIG. 10 is a side view similar to the view illustrated in FIG. 8, illustrating a second resilient sealing ring.

FIG. 9 is a side view of a dual sealing ring connector according to a seventh embodiment of the present application. As shown in FIG. 9, the first circumferential sealing portion 12 comprises a first circumferential joint head 120 and a first circumferential joint rod 121. The second circumferential sealing portion 13 comprises second circumferential locking tabs 130. The first circumferential joint rod 121 extends in a circumferential direction z from the first circumferential sealing portion 12 toward the second circumferential sealing portion 13. The first circumferential joint head 120 is arranged at an end of the first circumferential joint rod 121 and has a shape that is mirror-image symmetrical along an axis of symmetry of the first circumferential joint rod 121. The second circumferential locking tabs 130 are arranged in the axial direction x on both sides of the portion of the second circumferential sealing portion 13 corresponding to the first circumferential joint rod 121. The second circumferential locking tabs 130 extend in the circumferential direction z from the second circumferential sealing portion 13 toward the first circumferential sealing portion 12, and its length along the circumferential direction z is less than ⅔ of the sum of the lengths of the first circumferential joint head 120 and the first circumferential joint rod 121 along the circumferential direction z.

In the dual sealing ring connector of FIGS. 6-FIG. 9, the third circumferential sealing portion 22 and the fourth circumferential sealing portion 23 may have the same configuration as the first circumferential sealing portion 12 and the second circumferential sealing portion 13, or they may have different configurations. For example, in one case, the first circumferential sealing portion 12 and the second circumferential sealing portion 13 have a configuration as shown in FIG. 8, while the third circumferential sealing portion 22 and the fourth circumferential sealing portion 23 have a configuration as shown in FIG. 9. However, regardless of whether the configuration of the third circumferential sealing portion 22 and the fourth circumferential sealing portion 23 is the same as the configuration of the first circumferential sealing portion 12 and the second circumferential sealing portion 13, the third circumferential sealing portion 22 and the fourth circumferential sealing portion 23 have dimensions that are 35%-75% of the corresponding dimensions of the first circumferential sealing portion 12 and the second circumferential sealing portion 13. The first radial notch 11 and the second radial notch 21 are spaced by more than 5 degrees along the circumferential direction.

The preceding description of the embodiments has been arranged for illustrative and descriptive purposes. It is not intended to be exhaustive or to limit the embodiments to the variants described. Many modifications and variations will be apparent to those skilled in the art. These embodiments have been selected and described in order to best elucidate the principles and practical applications so that those skilled in the art will be able to understand the embodiments in terms of their various embodiments as well as the various modifications applicable to their intended use. Within the framework of the embodiments, the components and features described above may be combined between different embodiments.

The invention claimed is:

1. A dual sealing ring connector comprising:
    a first resilient sealing ring;
    a second resilient sealing ring partially embedded in the first resilient sealing ring;
    wherein:
        the dual sealing ring connector comprises a holding portion and an inserting portion;
        the inserting portion is shaped to correspond to the holding portion and embedded into the holding portion;
        the inserting portion comprises a joint head, a joint rod, and locking tabs;
        the joint rod extends in an extension direction, the extension direction being at least one of a radial direction, an axial direction, or a circumferential direction;
        the joint head is arranged at an end of the joint rod and has a shape that is mirror-image symmetrical along an axis of symmetry of the joint rod;
        the locking tabs are arranged on both sides of the joint rod and are spaced apart from the joint rod by a distance;
        the locking tabs extend in a same direction as the extension direction of the joint rod, and a length of the locking tabs in the extension direction is less than ⅔ of a sum of lengths of the joint head and the joint rod in the extension direction of the joint rod;
        the locking tabs comprise a raised portion having an extension direction extending toward the joint rod, and an angle between the extension direction of the locking tabs and the extension direction of the joint rod is 5-35 degrees, such that a spacer sleeve configuration is formed between a portion of the holding portion corresponding to the joint rod and a portion of the holding portion corresponding to the locking tabs; and
        the spacer sleeve configuration has at least one protruding portion comprising a resiliently bending and deforming portion with a radius of curvature of 1-4 mm such that, in an event that the inserting portion is inserted into the holding portion (10), the protruding portion squeezes the spacer sleeve configuration in order to resiliently deform the spacer sleeve configuration against the joint rod and the joint head.

2. The dual sealing ring connector according to claim 1, wherein the holding portion is arranged on one of the first resilient sealing ring or the second resilient sealing ring, and the inserting portion is arranged on the other of the first resilient sealing ring or the second resilient sealing ring.

3. The dual sealing ring connector according to claim 2, wherein the first resilient sealing ring comprises the inserting portion as a first inserting portion, and the second resilient sealing ring comprises another inserting portion as a second inserting portion, and wherein the first inserting portion arranged on the first resilient sealing ring has a different shape than the second inserting portion arranged on the second resilient sealing ring, and the second inserting portion arranged on the second resilient sealing ring has a size of 35%-75% of the first inserting portion arranged on the first resilient sealing ring.

4. The dual sealing ring connector according to claim 1, wherein:
    the joint head comprises a flat section having a first side and a second side and inclined sections arranged on the first side and the second side of the flat section;
    an outer edge of the flat section is in a straight or curved line with a length less than a length of a base of the joint rod in a direction perpendicular to the extension direction of the joint rod;
    lengths of the inclined sections are 30%-80% of a sum of the lengths of the joint head and the joint rod in the extension direction of the joint rod;
    an angle between the inclined sections and the joint rod is acute; and
    in the direction perpendicular to the extension direction of the joint rod, a maximum length of the joint head is 130%-200% of the length of the base of the joint rod.

5. The dual sealing ring connector according to claim 1, wherein: a cross-sectional shape of the joint head comprises a semicircular, oval, trapezoidal, anchor, or crescent shape.

6. The dual sealing ring connector according to claim 1, wherein: the joint rod has a shape that tapers with extension and the sides of the joint rod are curved.

7. The dual sealing ring connector according to claim 1, wherein: a spacing distance between the joint head and the locking tabs is 1-3 times a difference between a maximum length of the joint head in a direction perpendicular to the extension direction of the joint rod and a minimum length of the joint rod in the direction perpendicular to the extension direction of the joint rod.

8. The dual sealing ring connector according to claim 1, wherein: the first resilient sealing ring and the second resilient sealing ring are made of rubber-plastic materials with a same or a different hardness.

9. The dual sealing ring connector according to claim 1, the first resilient sealing ring comprises a first radial notch, the second resilient sealing ring comprises a second radial notch spaced in a circumferential direction by more than 5 degrees from the first radial notch, the holding portion and the inserting portion are arranged as a first holding portion and a first inserting portion both on the first resilient sealing ring and are separated by the first radial notch, and another holding portion and another inserting portion are arranged as a second holding portion and a second inserting portion both on the second resilient sealing ring and are separated by the second radial notch.

10. The dual sealing ring connector according to claim 9, wherein the first inserting portion has a different shape than the second inserting portion, and the second inserting portion has a size of 35%-75% of the first inserting portion.

\* \* \* \* \*

UNITED STATES PATENT AND TRADEMARK OFFICE
CERTIFICATE OF CORRECTION

| | | |
|---|---|---|
| PATENT NO. | : 12,449,037 B2 | Page 1 of 1 |
| APPLICATION NO. | : 18/434340 | |
| DATED | : October 21, 2025 | |
| INVENTOR(S) | : Zhao et al. | |

It is certified that error appears in the above-identified patent and that said Letters Patent is hereby corrected as shown below:

On the Title Page

Please insert item (30) the Foreign priority information as follows:
--CN 202311472764.6 filed November 7, 2023--

Signed and Sealed this
Thirteenth Day of January, 2026

John A. Squires
*Director of the United States Patent and Trademark Office*